(12) United States Patent
Patil

(10) Patent No.: US 10,838,883 B2
(45) Date of Patent: Nov. 17, 2020

(54) SYSTEM AND METHOD OF ACCELERATING ARBITRATION BY APPROXIMATING RELATIVE AGES

(71) Applicant: VIA ALLIANCE SEMICONDUCTOR CO., LTD., Shanghai (CN)

(72) Inventor: Nikhil A. Patil, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 331 days.

(21) Appl. No.: 15/241,765

(22) Filed: Aug. 19, 2016

(65) Prior Publication Data

US 2017/0060581 A1 Mar. 2, 2017

Related U.S. Application Data

(60) Provisional application No. 62/211,927, filed on Aug. 31, 2015.

(51) Int. Cl.
  *G06F 13/16* (2006.01)
  *G06F 13/362* (2006.01)
  *G06F 9/38* (2018.01)

(52) U.S. Cl.
  CPC ........ *G06F 13/1605* (2013.01); *G06F 9/3836* (2013.01); *G06F 9/3855* (2013.01); *G06F 13/1642* (2013.01); *G06F 13/3625* (2013.01)

(58) Field of Classification Search
  CPC ........ G06F 9/3836; G06F 9/3855; G06F 9/50; G06F 9/4881; G06F 13/1605; G06F 13/3625; G06F 13/1642

(Continued)

(56) References Cited

U.S. PATENT DOCUMENTS 5,684,971 A * 11/1997 Martell ................. G06F 9/3836
                                                                      712/214
6,065,105 A * 5/2000 Zaidi .................... G06F 9/3836
                                                                       712/215

(Continued)

FOREIGN PATENT DOCUMENTS

| WO | WO91/20041 A1 | 12/1991 |
| WO | WO96/35174 A2 | 11/1996 |

*Primary Examiner* — Aimee Li
*Assistant Examiner* — Courtney P Carmichael-Moody
(74) *Attorney, Agent, or Firm* — McClure, Qualey & Rodack, LLP

(57) ABSTRACT

An arbiter that performs accelerated arbitration by approximating relative ages including a memory, blur logic, and grant logic. Multiple entries arbitrate for one or more resources. The memory stores age values each providing a relative age between each pair of entries, and further stores blurred age values. The entries are divided into subsets in which each entry belongs to only one subset. The blur logic determines each blurred age value to indicate a relative age between an entry of a first subset and an entry of a different subset for each pair of subsets. The grant logic grants access by an entry to a resource based on relative age using corresponding age values when comparing relative age between entries within a common subset, and using corresponding blurred age values when comparing relative age between entries in different subsets. Each blurred age value represents multiple age values to simplify arbitration.

19 Claims, 5 Drawing Sheets

(58) Field of Classification Search
USPC .......................................................... 712/214
See application file for complete search history.

(56) References Cited

U.S. PATENT DOCUMENTS

| | | | |
|---|---|---|---|
| 7,062,582 | B1 | 6/2006 | Chowdhuri |
| 7,080,170 | B1 * | 7/2006 | Zuraski, Jr. ............... G06F 5/10 |
| | | | 710/52 |
| 7,672,303 | B1 | 3/2010 | Baxter, III et al. |
| 8,705,368 | B1 | 4/2014 | Abts et al. |
| 9,367,322 | B1 * | 6/2016 | Brownscheidle ..... G06F 9/3836 |
| 9,372,698 | B2 * | 6/2016 | Sutanto ................. G06F 9/4881 |
| 10,379,865 | B1 * | 8/2019 | Menezes ............. G06F 12/0875 |
| 2004/0210695 | A1 | 10/2004 | Weber et al. |
| 2005/0050253 | A1 | 3/2005 | Rengarajan |
| 2008/0320016 | A1 * | 12/2008 | Singh .................... G06F 9/3836 |
| 2012/0124589 | A1 * | 5/2012 | Rupley .................... G06F 9/46 |
| | | | 718/103 |
| 2012/0291037 | A1 * | 11/2012 | Venkataramanan .. G06F 9/3012 |
| | | | 718/103 |
| 2013/0042089 | A1 * | 2/2013 | Vinh ..................... G06F 9/3836 |
| | | | 712/205 |
| 2014/0201471 | A1 | 7/2014 | Cutter et al. |
| 2015/0007188 | A1 * | 1/2015 | Sutanto ................ G06F 9/4881 |
| | | | 718/104 |
| 2016/0364237 | A1 * | 12/2016 | Kosarev ................ G06F 9/3836 |
| 2016/0371091 | A1 * | 12/2016 | Brownscheidle ..... G06F 9/3836 |
| 2017/0031686 | A1 * | 2/2017 | Brownscheidle ..... G06F 9/3836 |
| 2017/0168830 | A1 * | 6/2017 | Brownscheidle ..... G06F 9/3836 |
| 2017/0286120 | A1 * | 10/2017 | Kulkarni ............... G06F 9/3851 |
| 2017/0293489 | A1 * | 10/2017 | Ayub .................... G06F 9/3836 |

* cited by examiner

300

| ENTRY NUMBER | ENTRY | VALID | BIND VECTOR | READY | REQUEST VECTOR | GRANT VECTORS | | | |
|---|---|---|---|---|---|---|---|---|---|
| | | | | | | G1 | G2 | ... | GP |
| 1 | E1 | V1 | BV1[1:P] | R1 | REQ1[1:P] | G11 | G12 | ... | G1P |
| 2 | E2 | V2 | BV2[1:P] | R2 | REQ2[1:P] | G21 | G22 | ... | G2P |
| 3 | E3 | V3 | BV3[1:P] | R3 | REQ3[1:P] | G31 | G32 | ... | G3P |
| ⋮ | ⋮ | ⋮ | ⋮ | ⋮ | ⋮ | ⋮ | ⋮ | ... | ⋮ |
| N | EN | VN | BVN[1:P] | RN | REQN[1:P] | GN1 | GN2 | ... | GNP |

214

| | E1 | E2 | E3 | E4 | E5 | E6 | E7 | E8 | E9 | E10 | E11 | E12 | E13 | E14 | E15 | E16 |
|---|---|---|---|---|---|---|---|---|---|---|---|---|---|---|---|---|
| E1 | 0 | | | 402 | | | | | | | | | | | | |
| E2 | $A_{21}$ | 0 | | | | | | | | | | | | | | |
| E3 | $A_{31}$ | $A_{32}$ | 0 | | | | | | | | | | | | | |
| E4 | $A_{41}$ | $A_{42}$ | $A_{43}$ | 0 | | | | | | | | | | | | |
| E5 | $A_{51}$ | $A_{52}$ | $A_{53}$ | $A_{54}$ | 0 | | | 410 | | | | | | | | |
| E6 | $A_{61}$ | $A_{62}$ | $A_{63}$ | $A_{64}$ | $A_{65}$ | 0 | | | | | | | | | | |
| E7 | $A_{71}$ | $A_{72}$ | $A_{73}$ | $A_{74}$ | $A_{75}$ | $A_{76}$ | 0 | | | | | | | | | |
| E8 | $A_{81}$ | $A_{82}$ | $A_{83}$ | $A_{84}$ | $A_{85}$ | $A_{86}$ | $A_{87}$ | 0 | | | | | | | | |
| E9 | $A_{91}$ | $A_{92}$ | $A_{93}$ | $A_{94}$ | $A_{95}$ | $A_{96}$ | $A_{97}$ | $A_{98}$ | 0 | | 416 | | | | | |
| E10 | $A_{10\_1}$ | $A_{10\_2}$ | $A_{10\_3}$ | $A_{10\_4}$ | $A_{10\_5}$ | $A_{10\_6}$ | $A_{10\_7}$ | $A_{10\_8}$ | $A_{10\_9}$ | 0 | | | | | | |
| E11 | $A_{11\_1}$ | $A_{11\_2}$ | $A_{11\_3}$ | $A_{11\_4}$ | $A_{11\_5}$ | $A_{11\_6}$ | $A_{11\_7}$ | $A_{11\_8}$ | $A_{11\_9}$ | $A_{11\_10}$ | 0 | | | | | |
| E12 | $A_{12\_1}$ | $A_{12\_2}$ | $A_{12\_3}$ | $A_{12\_4}$ | $A_{12\_5}$ | $A_{12\_6}$ | $A_{12\_7}$ | $A_{12\_8}$ | $A_{12\_9}$ | $A_{12\_10}$ | $A_{12\_11}$ | 0 | | | | |
| E13 | $A_{13\_1}$ | $A_{13\_2}$ | $A_{13\_3}$ | $A_{13\_4}$ | $A_{13\_5}$ | $A_{13\_6}$ | $A_{13\_7}$ | $A_{13\_8}$ | $A_{13\_9}$ | $A_{13\_10}$ | $A_{13\_11}$ | $A_{13\_12}$ | 0 | | | 420 |
| E14 | $A_{14\_1}$ | $A_{14\_2}$ | $A_{14\_3}$ | $A_{14\_4}$ | $A_{14\_5}$ | $A_{14\_6}$ | $A_{14\_7}$ | $A_{14\_8}$ | $A_{14\_9}$ | $A_{14\_10}$ | $A_{14\_11}$ | $A_{14\_12}$ | $A_{14\_13}$ | 0 | | |
| E15 | $A_{15\_1}$ | $A_{15\_2}$ | $A_{15\_3}$ | $A_{15\_4}$ | $A_{15\_5}$ | $A_{15\_6}$ | $A_{15\_7}$ | $A_{15\_8}$ | $A_{15\_9}$ | $A_{15\_10}$ | $A_{15\_11}$ | $A_{15\_12}$ | $A_{15\_13}$ | $A_{15\_14}$ | 0 | |
| E16 | $A_{16\_1}$ | $A_{16\_2}$ | $A_{16\_3}$ | $A_{16\_4}$ | $A_{16\_5}$ | $A_{16\_6}$ | $A_{16\_7}$ | $A_{16\_8}$ | $A_{16\_9}$ | $A_{16\_10}$ | $A_{16\_11}$ | $A_{16\_12}$ | $A_{16\_13}$ | $A_{16\_14}$ | $A_{16\_15}$ | 0 |

|     | E1        | E2        | E3        | E4  | E5        | E6        | E7        | E8  | E9          | E10          | E11          | E12 | E13          | E14          | E15          | E16 |
|-----|-----------|-----------|-----------|-----|-----------|-----------|-----------|-----|-------------|--------------|--------------|-----|--------------|--------------|--------------|-----|
| E1  | 0         |           |           | 402 |           |           |           |     |             |              |              |     |              |              |              |     |
| E2  | $A_{21}$  | 0         |           |     |           |           |           |     |             |              |              |     |              |              |              |     |
| E3  | $A_{31}$  | $A_{32}$  | 0         |     |           |           |           |     |             |              |              |     |              |              |              |     |
| E4  | $A_{41}$  | $A_{42}$  | $A_{43}$  | 0   |           |           |           |     |             |              |              |     |              |              |              |     |
| E5  |           |           |           |     | 0         |           |           | 410 |             |              |              |     |              |              |              |     |
| E6  |           | 504       |           |     | $A_{65}$  | 0         |           |     |             |              |              |     |              |              |              |     |
| E7  |     B1: OLDEST OF E1-E4 VS OLDEST OF E5-E8 |  |  |     | $A_{75}$  | $A_{76}$  | 0         |     |             |              |              |     |              |              |              |     |
| E8  |           |           |           |     | $A_{85}$  | $A_{86}$  | $A_{87}$  | 0   |             |              |              |     |              |              |              |     |
| E9  |           |           |           |     |           |           |           |     | 0           |              |              | 416 |              |              |              |     |
| E10 |     506 B2: OLDEST OF E1-E4 VS OLDEST OF E9-E12 |  |  |     |     512 B4: OLDEST OF E5-E8 VS OLDEST OF E9-E12 |  |  |     | $A_{10\_9}$ | 0            |              |     |              |              |              |     |
| E11 |           |           |           |     |           |           |           |     | $A_{11\_9}$ | $A_{11\_10}$ | 0            |     |              |              |              |     |
| E12 |           |           |           |     |           |           |           |     | $A_{12\_9}$ | $A_{12\_10}$ | $A_{12\_11}$ | 0   |              |              |              |     |
| E13 |           |           |           |     |           |           |           |     |             |              |              |     | 0            |              |              | 420 |
| E14 |     508 B3: OLDEST OF E1-E4 VS OLDEST OF E13-E16 |  |  |     |     514 B5: OLDEST OF E5-E8 VS OLDEST OF E13-E16 |  |  |     |     518 B6: OLDEST OF E9-E12 VS OLDEST OF E13-E16 |  |  |     | $A_{14\_13}$ | 0            |              |     |
| E15 |           |           |           |     |           |           |           |     |             |              |              |     | $A_{15\_13}$ | $A_{15\_14}$ | 0            |     |
| E16 |           |           |           |     |           |           |           |     |             |              |              |     | $A_{16\_13}$ | $A_{16\_14}$ | $A_{16\_15}$ | 0   |

*FIG. 5*

SYSTEM AND METHOD OF ACCELERATING ARBITRATION BY APPROXIMATING RELATIVE AGES

CROSS-REFERENCE TO RELATED APPLICATIONS

This application claims the benefit of U.S. Provisional Application Ser. No. 62/211,927, filed on Aug. 31, 2015, which is hereby incorporated by reference in its entirety for all intents and purposes.

BACKGROUND OF THE INVENTION

Field of the Invention

The present invention relates in general to arbitration between multiple requests for one or more resources, and more particularly to accelerating arbitration by approximating relative age values to provide approximate arbitration results.

Description of the Related Art

In the world of electronics including computer systems and the like, arbitration is the process of selecting among multiple requests for service or for access to a limited resource. Arbitration is used in many different applications and contexts. In a networking application, for example, arbitration may be used by a router or switch for transferring information (e.g., frames or packets) between multiple communication ports. In a computer application, arbitration may be used for selecting from among multiple bus masters requesting access to a common bus or interface. Arbitration may also be used for selecting among multiple memory lines (e.g., cache lines) for storage into a memory or for retrieval from the memory. In an out-of order (O-O-O) processor (e.g., microprocessor, processing unit, central processing unit (CPU), processing core, microcontroller, system on a chip (SOC), etc.), arbitration may be used by a scheduler or the like to select from among multiple instructions for execution.

An arbiter for performing an arbitration process may use one or more of multiple selection criterion for selecting from among multiple requests. One selection criterion, for example, is first-come, first-served (FCFS) in which the oldest request is serviced first. An FCFS arbiter may use an age determination system, such as a first-in, first-out (FIFO) queue or a time stamp system or the like for determining the ages of the requests. Another selection criterion is based on priority level, in which the request having the highest priority level is serviced first before an older request with a lower priority level. Of course, a combination of such selection criterion may be employed, such as a determination of the oldest request among multiple requests having the same priority level. Other selection criterion may be used depending upon the particular application. Some applications require "perfect" or exact arbitration results, in which the oldest or highest priority request is guaranteed to be serviced first. Many applications, however, allow for "imperfect" or approximate results, in which a lower priority request may, on occasion, be selected before a higher priority request.

In a microprocessor application, the microprocessor executes the macroinstructions of a program, in which the macroinstructions are selected from an instruction set architecture, such as the x86 instruction set architecture or the like. Many modern microprocessors include an internal instruction translator that receives and translates the macroinstructions into microinstructions that are configured for execution by the microprocessor. The microinstructions are then provided to a register alias table or rename structure or the like, which generates microinstruction dependencies and then issues the microinstructions in program order to a scheduler. The scheduler then dispatches the microinstructions to the appropriate execution units that are configured to execute the instructions. The microprocessor may be implemented with a superscalar architecture to allow multiple microinstructions to be executed in parallel by multiple execution units for faster throughput. The scheduler of a superscalar microprocessor may dispatch the microinstructions to the execution units out-of-order (O-O-O) to further improve efficiency and overall throughput. An internal reorder buffer or the like resolves instruction conflicts and ensures that the microinstructions are retired in order. The scheduler performs grant determinations for its output ports in which it determines, for each output port, which microinstructions are the oldest ones that are also ready for execution.

The scheduler of a microprocessor, therefore, effectively acts as a buffer located between the rename structure and the execution units. It is advantageous for the scheduler to be able to receive and store a relatively large number of issued microinstructions in order to increase the number of dispatched microinstructions per clock cycle to improve overall efficiency and throughput. The larger the number of issued instructions within the scheduler, however, the more complicated the arbitration and grant logic used to implement and perform the grant determinations. Ideally, the oldest instruction that is ready to execute should have the highest priority to be dispatched for execution. As the circuitry of the scheduler becomes more complex, the ability of the scheduler to arbitrate among multiple instructions to be dispatched while meeting timing criteria becomes more difficult.

SUMMARY OF THE INVENTION

An arbiter that performs accelerated arbitration according to one embodiment includes a memory, blur logic, and grant logic. Multiple entries arbitrate for one or more resources. The memory stores relative age values each providing a relative age between each pair of entries, and further stores blurred age values. The entries are divided into subsets in which each entry belongs to only one subset. The blur logic determines each blurred age value to represent a relative age between an entry of one subset and an entry of a different subset. The grant logic grants access by an entry to a resource based on relative age using corresponding relative age values when comparing relative age between entries within a common subset, and using corresponding blurred age values when comparing relative age between entries in different subsets.

In this manner, a relative age value is used when comparing relative age between two entries within the same subset, and a representative blurred age value is used instead when comparing relative age between two entries in different subsets. A single blurred age value is used to represent multiple relative age values that compare relative age of entries between different subsets. The use of a single approximated or "blurred" age value to represent a group of relative age values simplifies circuitry and accelerates the arbitration process.

In one embodiment, the blur logic includes first and second age logic and select logic. The first age logic selects an oldest entry of a first subset and provides at least one first select signal, and the second age logic selects an oldest entry of a second subset and provides at least one second select signal. The select logic select logic uses the first and second select signals to determine a blurred age value as a selected relative age value between entries of the first and second subsets. For example, the relative age value between the oldest entries of the first and second subsets is used as the representative relative age value between any entry from the first subset and any entry from the second subset.

Binder logic may be included that binds each entry to one of multiple resources in which each entry only arbitrates for that resource to which it is bound. Ready logic may be included that determines when each entry is ready to arbitrate, such that each entry only arbitrates after being determined to be ready. A combination of binder and ready logic may be included such that each entry only arbitrates for that resource to which it is bound and only after being determined to be ready. The grant logic combines the grant and ready logic with the age and blurred age values for granting access to each of multiple resources.

Arbitration using approximate age values as described herein is useful in any application in which it is desired to arbitrate between multiple entries for limited resources in which approximated results are acceptable. In a particular application described herein, the arbiter is useful for simplifying the grant determinations for selecting instructions to dispatch from a scheduler of a microprocessor or the like.

A method of accelerating arbitration using approximate relative ages according to one embodiment includes determining multiple age values each indicating a relative age between a pair of multiple entries that arbitrate for at least one resource, dividing the entries into multiple subsets in which each subset includes more than one and less than all of the entries and in which each entry is included in only one subset, determining multiple blurred age values in which each blurred age value indicates a relative age between any entry of a first subset and any entry of a second and different subset, and granting access of the at least one resource to one of at least two entries based on relative age. Granting access includes using a corresponding age value when comparing a relative age between two entries that are within a common subset, and using a corresponding blurred age value when comparing a relative age between two entries that are in different subsets.

The method may include selecting an oldest entry of a first subset of entries, selecting an oldest entry of a second subset of entries, and selecting a relative age value that determines relative age between the oldest entry of the first subset of entries and the oldest entry of the second subset of entries as the corresponding blurred age value between the first and second subset of entries.

BRIEF DESCRIPTION OF THE DRAWINGS

The benefits, features, and advantages of the present invention will become better understood with regard to the following description, and accompanying drawings where:

FIG. 4 is a diagram illustrating the age matrix of FIG. 2 according to one embodiment of the present invention for storing relative age bits;

FIG. 5 is a diagram illustrating the blur matrix of FIG. 2 according to one embodiment of the present invention for storing relative age bits and blurred age bits.

DETAILED DESCRIPTION

Figure 1:
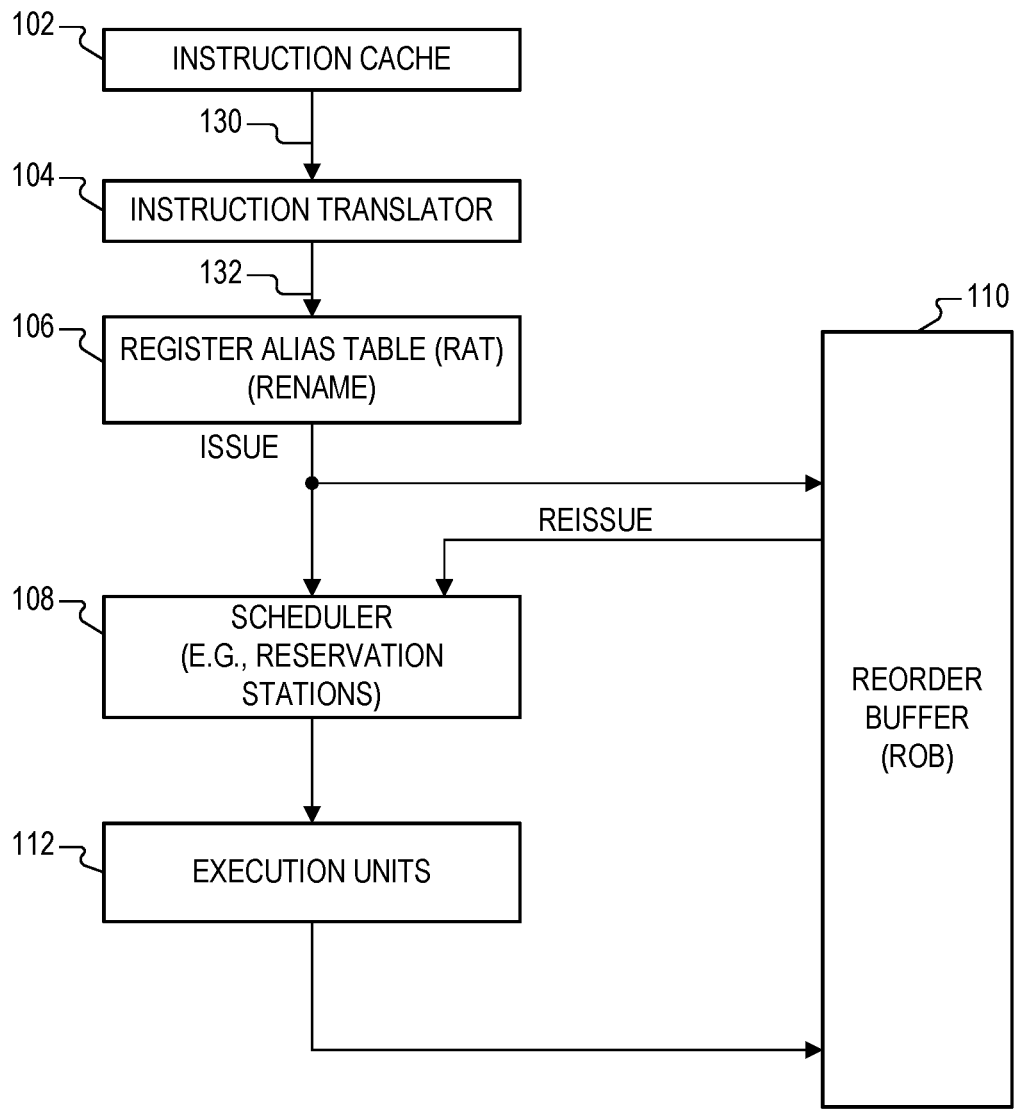
FIG. 1 is a simplified block diagram of a superscalar, pipelined microprocessor including a scheduler implemented with a system and method of accelerating arbitration using approximate relative ages according to one embodiment of the present invention.

The inventor has recognized the inefficiencies and timing issues associated with dispatching instructions from a scheduler of a microprocessor. He has therefore developed an arbiter that accelerates the arbitration process to provide approximate results using approximate age values. An arbiter using approximate age values as described herein is useful for simplifying the grant determinations for selecting instructions to dispatch from the scheduler. It is understood, however, that an arbiter using approximate age values as described herein is also useful in applications other than microprocessors. An arbiter using approximate age values as described herein is useful in any application in which it is desired to arbitrate between multiple entries for limited resources in which approximated results are acceptable.

As described herein, an age matrix is used to distinguish between older instructions (or entries) and younger entries, in which the age matrix stores relative age values that compare the relative age of each entry with every other entry. As the number of instructions or entries increases, the larger the age matrix becomes and the more difficult to achieve critical timing using the relative age values. Instead, rather than using all of the relative age values directly for making grant determinations, "blurred" age values are determined in which each blurred age value is an approximation of a subgroup or subset of relative age values. The total number of entries that may arbitrate for resources at any given time is divided into multiple subsets in which each subset includes a selected number of entries and in which each entry is a member of only one subset. A single blurred age value is determined to represent the relative age between any entry of one subset and any entry of a different subset. Thus, rather than using multiple relative age values between each entry of one subset and each entry of the different subset, only one blurred age value is needed.

The use of a single approximated or "blurred" age value to represent a group of relative age values simplifies the circuitry and accelerates the arbitration process. The grant equation used for determining an entry to be granted access to a resource generally compares the age of each entry with the age every other entry for identifying the oldest entry. When comparing the relative age between two entries within the same subset, a corresponding relative age value is used. When comparing the relative age between two entries within different subsets, however, the corresponding blurred age value is used instead. Since a single blurred age value is used to represent an entire group of relative age values within each of multiple grant equations implemented in circuitry, the arbitration process is simplified and accelerated. A simplified blur matrix is derived from the age matrix and includes the blurred age values, and each blurred age value is used as a substitute for a group of relative age values to make the grant determinations. The simplified blur matrix enables approximate yet acceptable results to be achieved with less circuitry and/or in significantly less time so that predetermined timing parameters may be met.

FIG. 1 is a simplified block diagram of a superscalar, pipelined microprocessor 100 including a scheduler 108 implemented with a system and method of accelerating arbitration using approximate relative ages according to one embodiment of the present invention. The scheduler 108 is also commonly known as the reservation stations. The microprocessor 100 includes an instruction cache 102 that caches macroinstructions 130 of an instruction set architecture, such as the x86 instruction set architecture or the like. Additional or alternative instruction set architectures are contemplated. The microprocessor 100 includes an instruction translator 104 that receives and translates the macroinstructions 130 into microinstructions 132. The microinstructions 132 are then provided to a register alias table (RAT) 106 (a.k.a., "rename" table), which generates microinstruction dependencies of the microinstructions 132 and issues the microinstructions 132 in program order to the scheduler 108 and to a reorder buffer (ROB) 110. The scheduler 108 dispatches each issued microinstruction to an appropriate one of multiple execution units 112. The execution units 112 provide their results to the ROB 110, which ensures in-order retirement of instructions to architectural state.

The microinstructions issued from the RAT 106 (ISSUE) may typically be referred to as microinstructions, but are more generally referred to herein simply as "instructions." The ROB 110 stores an entry for every instruction issued from the RAT 106. If the scheduler 108 becomes full, the ROB 110 may continue to receive issued instructions. Eventually, the scheduler 108 is able to dispatch instructions to the execution units 112 so that it may receive more instructions. After the scheduler 108 indicates that it is no longer full, instructions are temporarily reissued from the ROB 110 (REISSUE) to the scheduler 108 to maintain program ordering of the instructions.

The execution units 112 generally include one or more functional units and one or more memory units for processing corresponding instruction types. In one embodiment, the execution units 112 include one or more floating point units for processing floating point or "media" type instructions, one or more integer units for processing integer instructions, one or more load units for processing memory load instructions, and one or more store units for handling memory store instructions. In addition or in the alternative, one or more of the load and store memory units may be combined into a load/store (LS) unit or the like.

Figure 2:
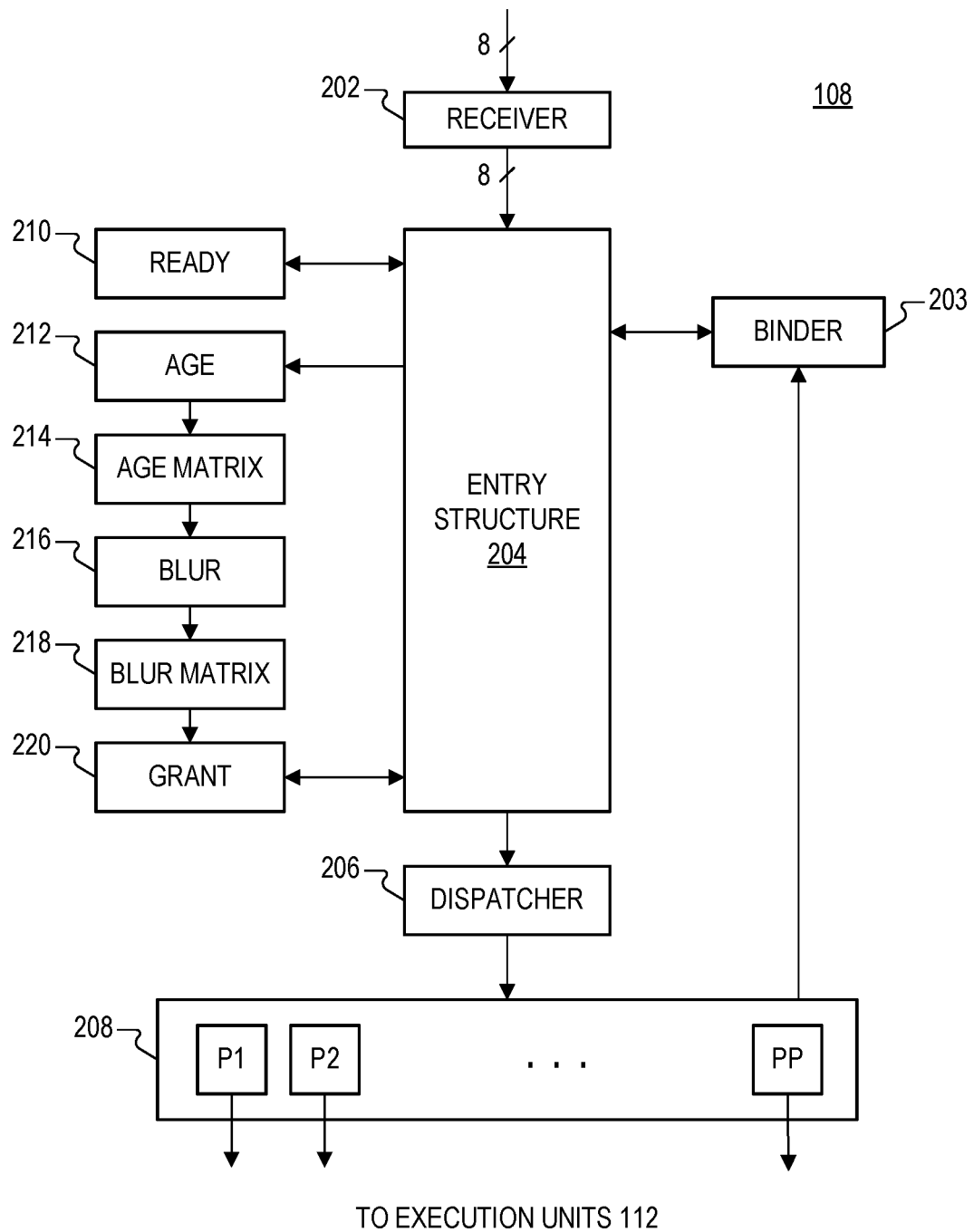
FIG. 2 is a more detailed block diagram of the scheduler of FIG. 1 incorporating an arbitration system according to one embodiment of the present invention.

FIG. 2 is a more detailed block diagram of the scheduler 108 incorporating an arbitration system implemented according to one embodiment of the present invention. The RAT 106 and/or the ROB 110 issues (or reissues) up to 8 instructions per cycle in program order to the scheduler 108. The scheduler 108 includes a receiver 202, which inserts the received instructions into an entry structure 204 and marks the entry as valid. A dispatcher 206 dispatches instructions from the entry structure 204 to the execution units 112 via a number of "P" dispatch ports 208 (individually shown as P1, P2, . . . , PP), in which P is a positive integer. In one embodiment, the dispatch ports 208 include seven (P=7) different ports numbered P1, P2, . . . , P6 (P1-P7), each for dispatching up to one (1) instruction per cycle to a corresponding execution unit. When an instruction is dispatched, the corresponding entry within the entry structure 204 is marked, such as by the dispatcher 206, as invalid and thus available to receive a new instruction.

The dispatch ports 208 may be configured according to a one-to-one (1:1) correspondence with the individual execution units. In another embodiment, the first four ports P1-P4 are functional ports for dispatching integer or floating point instructions to corresponding integer or floating point execution units, and the last three ports P5-P7 are memory type ports for dispatching load or store (LS) instructions. It is understood, however, that any particular number, configuration and execution unit association may be used. The scheduler 108 further includes a binder 203 that binds each instruction to a corresponding one of multiple dispatch ports 208 when entered into the entry structure 204. The binder 203 further updates corresponding bind vectors as further described herein. The binding determination is made depending upon the instruction type and the relative availability of the dispatch ports 208. For example, each new instruction may be bound to distribute load among the dispatch ports 208 appropriate for the instruction type.

It is noted that "up to 8" instructions being issued per cycle is intended to mean that any number from zero (0) to eight may be issued per clock cycle, in which no instructions (0 instructions) may be issued for one or more clock cycles under certain operating conditions, such as, for example, when the entry structure 204 is full. Also, "up to one" instruction dispatched per cycle per dispatch port may include 0 instructions for one or more cycles under certain operating conditions, such as when a corresponding one or more of the execution units 112 are busy or unable to receive further instructions, or when the scheduler 108 does not have a full number instructions of a given type that are ready for dispatch on the corresponding dispatch ports. Thus, 0 or 1 instructions may be dispatched per dispatch port per clock cycle for a total of 0 to P (e.g., 8) instructions per cycle.

The scheduler 108 also includes ready logic 210 that determines when each valid instruction stored in the entry structure 204 is ready for dispatch. The ready logic 210 makes a ready determination for each instruction, meaning that the instruction has met all of its conditions for being dispatched to an execution unit, such as when any necessary operands are available for executing the instruction. The ready determination may also consider whether a corresponding execution unit is available for executing the instruction.

The scheduler 108 further includes age logic 212 that updates an age matrix 214 as newer instructions are stored into the entry structure 204. The age matrix 214 includes multiple relative age values each indicating the relative age between a pair of instructions stored in the entry structure 204. In the illustrated embodiment, the relative age values are in the form of age comparison bits in which each relative age bit indicates the relative age between two instruction entries of the entry structure 204. In this manner, the age matrix 214 may be consulted to determine the relative age of each stored instruction in comparison with every other stored instruction. Newer instructions stored within the entry structure 204 are considered "younger" than those already stored, which are considered "older." When multiple instructions (e.g., up to 8) are entered together during one clock cycle, they are provided in program order in which first ones are considered older than the last ones in any given group since the instructions are issued in program order. Generally speaking, a desired function of the scheduler 108 is to select, for each dispatch port, the oldest (or from among the oldest) instruction that is ready to be dispatched.

It is noted that the microprocessor 100 is an out-of-order (O-O-O) machine in which younger instructions that are ready to be dispatched may be dispatched before older instructions that are not ready to be dispatched. Also, even among all of the instructions that are ready to be dispatched, port loading conditions may result in a newer instruction being dispatched from one port before an older instruction from another port. Also, as described further herein, the arbitration process among instructions ready for dispatch simplifies and approximates arbitration selection using approximate age values to simplify circuitry and to achieve faster results. The approximated arbitration selection uses a blurring function by selecting one relative age value from among a subgroup or subset of relative age values to provide a blurred or approximate age value to represent the subset. The approximated arbitration selection may sometimes result in newer instructions being dispatched before older instructions also ready to be dispatched, but this is an acceptable solution given substantially improved performance from cycle to cycle.

As further described herein, the entry structure 204 stores up to "N" instructions at a time, in which N is a positive integer. When N is a relatively large number, the age matrix 214 stores a significant number of age comparison bits which may result in problematic routing, congestion and timing issues for making the grant determinations for identifying which instructions are to be dispatched first from each dispatch port 208. The scheduler 108 further includes blur logic 216 and a blur matrix 218 to help alleviate or otherwise resolve the routing, congestion and timing issues for making the grant determinations. In particular, the blur logic 216 is approximating logic that applies the blurring function to replace the relative age bits between one set of entries and another set of entries by a single blurred age bit. In essence, this means that each entry of a corresponding sub-block effectively inherits the age of the oldest neighbor within that sub-block. The use of a single blurred age bit to represent multiple relative age bits simplifies the grant logic as further described herein to accelerate the arbitration process. The accelerated arbitration process achieves approximated results in a shorter amount of time to improve overall performance over time.

The scheduler 108 further includes grant logic 220 that updates a "one-hot" N-bit grant vector for each of the dispatch ports 208. The grant vectors may be stored within the entry structure 204, although a separate memory structure or even routing mechanisms (e.g., conductors or wires) may be used to store or otherwise convey the grant vectors. In one embodiment, the grant logic 220 monitors bind vectors and ready bits within the entry structure 204 to determine request vectors, and further uses either relative or blurred age values in the blur matrix 218 to update the grant vectors. Each of the grant vectors are "one-hot," meaning that only one of the bits of each grant vector may be true at a time identifying which instruction is to be dispatched on the corresponding dispatch port during the current clock cycle. As used herein, the term "one-hot" as applied to a vector or set of bits means that only one bit is true at a time or else they are all false (e.g., all bits are "0" or only one bit is set to "1" at a time while the rest are "0"). The dispatcher 206 consults the grant vector information to select the instructions to be dispatched from the dispatch ports 208 for each clock cycle.

Figures 3, 6:
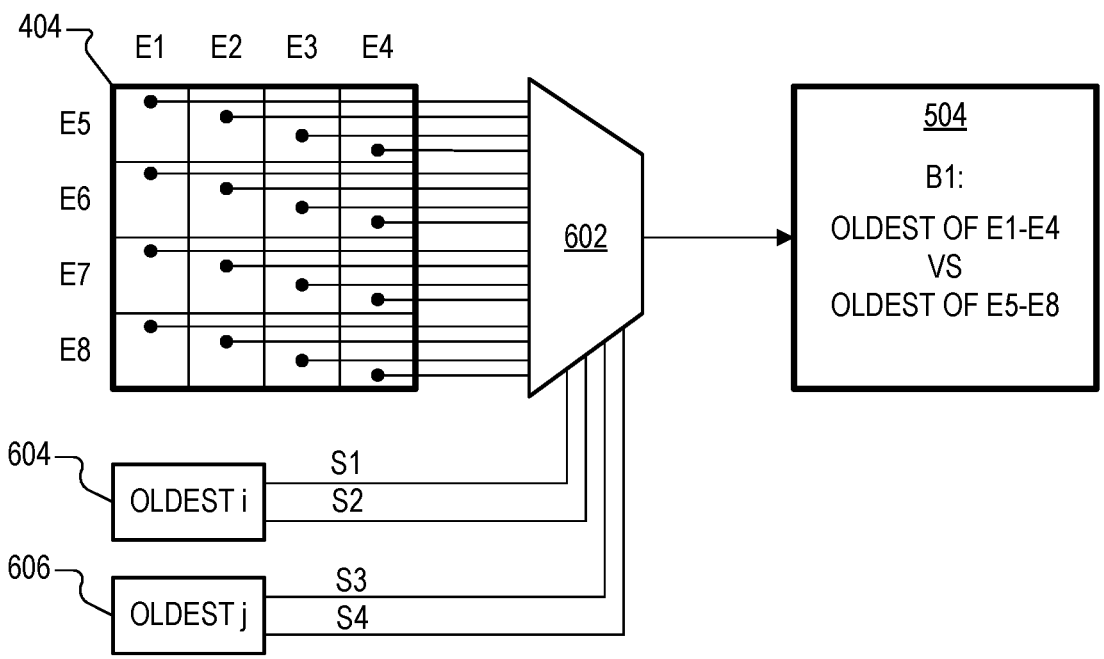
FIG. 3 is a tabular diagram depicting information that is used for making grant determinations according to one embodiment of the present invention.
FIG. 6 is a schematic and block diagram illustrating the blurring function applied to a sub-block of the age matrix of FIG. 4 to determine the blurred age bit of a corresponding sub-block of the blur matrix of FIG. 2 according to one embodiment of the present invention.

FIG. 3 is a tabular diagram 300 depicting information that is used for making grant determinations according to one embodiment of the present invention. Although all of the information shown in the tabular diagram 300 may be stored in the entry structure 204, some of the information may be incorporated or stored within the microprocessor 100 in an alternative manner. A first column depicts an entry number from 1 to N (1, 2, 3, ..., N) which is used to identify the entry. The entry number is different from the age value or age comparison bit. It is noted that the entry numbers need not be actual stored values but simply represent the position within the entry structure 204 to identify the entries stored therein. The second column depicts the entry value itself ranging from E1 to EN (E1, E2, ..., EN), in which each entry may store a corresponding instruction to be dispatched or a corresponding identifier thereof. The third column depicts a valid bit ranging from V1 to VN (V1, V2, ..., VN), thereby providing a valid bit for each entry indicating whether the entry is valid or not. In general, an entry is marked as valid when receiving a newly issued instruction, and marked as invalid when the instruction is dispatched for execution. The entry row for a dispatched instruction becomes invalid until replaced by a newly issued instruction.

The next column depicts N bind vectors BV1[1:P]-BVN[1:P] to include one bind vector per entry, in which each bind vector includes P bits to identify to which port the instruction of the entry is bound. In the illustrated embodiment, each bind vector is a one-hot vector with P bits in which up to only one bit is set true to identify the port to which it is bound. In this manner, the bind value associated with a particular entry i bound to a given port p can be determined as BVip. Alternatively, the bind vectors may be replaced by bind values, such as port numbers or the like. The use of bind vectors simplifies the grant equations as described further herein. The receiver 202 stores each new instruction in an available or empty entry location and then updates the corresponding valid value. The binder 203 binds each new instruction to a dispatch port and updates the corresponding bind vector.

The next column in the entry structure 204 depicts N ready bits R1-RN, including one ready bit for each of the N entries. As previously described, the ready logic 210 makes a ready determination for each stored instruction and sets the ready bit accordingly when the instruction is ready to be dispatched.

The next column depicts N request vectors REQ1[1:P]-REQN[1:P] to include one request vector per entry, in which each request vector includes P bits that identifies when the instruction is ready to be dispatched from the dispatch port to which the instruction of the entry is bound. The request vectors REQ1[1:P]-REQN[1:P] are generated from a combination of the ready bits R1-RN and the bind vectors BV1[1:P]-BVN[1:P]. Each of the bits of each bind vector is logically AND'ed with a corresponding ready bit to form the corresponding request vector for each clock cycle. For example, each bit of the bind vector BV1[1:P] is logically AND'ed with the ready bit R1 per clock cycle to update the corresponding request vector REQ1[1:P] for the entry E1. In this manner, each request vector is also a one-hot vector with P bits in which only up to one bit is set true to identify when the instruction is ready to be dispatched from the dispatch port to which it is bound. It is noted that the ready logic 210 and/or the binder 203 may update the request vectors REQ1[1:P]-REQN[1:P] when either or both of the ready bits or bind vectors are updated.

The next set of columns depict P grant vectors G[1:N]1-G[1:N]P, one for each of the P dispatch ports 208, in which each grant vector is a one-hot vector including N bits for the N entries. For each grant vector, up to only one bit is set at a time indicating the instruction of the corresponding entry that has been granted to be dispatched for the corresponding dispatch port to which it is bound for the given clock cycle. As previously described, the grant logic 220 performs the grant function and determines which of the stored instructions should be dispatched for each dispatch port. For example, if the 5$^{th}$ bit of the grant vector G[1:N]2 for dispatch port P2 is true, then the dispatcher 206 selects entry E5 for dispatch on port P2.

In one embodiment, the instruction entries, the valid bits, the bind vectors and the ready bits may be stored in the entry structure 204, whereas the request and grant vectors are not stored within the entry structure 204. Instead, the request and grant vectors may just be "wires" or conductive traces or the like derived from the information from the entry structure 204.

FIG. 4 is a diagram illustrating the age matrix 214 according to one embodiment of the present invention. The age matrix 214 includes N rows and N columns for each of the N entries of the entry structure 204. FIG. 4 depicts a 16×16 matrix for N=16 for purposes of illustration, where it is understood that N may be more or less than 16 for various implementations. In one embodiment, for example, N=64 so that the age matrix 214 is a 64×64 matrix. A row and a column are provided for each of the entries E1-E16. The rows are indexed by the letter "i" and the columns are indexed by the letter "j", in which each relative age value is indexed as a relative age bit $A_{ij}$. Each relative age bit is a relative age value between two entries to identify relative age between the two instruction entries. It is noted that the relative age bit is denoted as $A_{i\_j}$ if either i or j has two digits meaning that it is greater than 9 (e.g., $A_{10\_12}$ is used to denote the relative age bit located in row 10, column 12). In one embodiment, each relative age bit $A_{ij}$=1 if entry "i" is newer than entry "j", or otherwise $A_{ij}$=0 if entry "i" is the same age or older than entry "j". Each entry along the diagonal denotes the case for i=j, meaning the entry compared with itself, so that each entry along the diagonal is zero.

A memory structure or device or the like with multiple storage elements may be used to store the age matrix 214. Each storage element stores a single relative age bit, and may be configured as a flip-flop or latch or the like. Since the relative age bits above the diagonal are inverted bit values of those below the diagonal, or $A_{ij}$=NOT($A_{ji}$), then the relative age bits for the upper portion of the matrix contain redundant information and are not included within the age matrix 214. Also, each of the diagonal entries are always 0 so that storage elements are not necessary for storing the diagonal entries. Thus, the memory for storing the age matrix 214 need only include N(N-1)/2 storage elements to store the same number of relative age bits. The non-included elements are blank.

The initial values for the age matrix 214 may be set to zero. As each new entry is added to the entry structure, corresponding relative age bits within the age matrix 214 are programmed accordingly. Since each new value added is the newest entry, then each of the bits of the entire row within the age matrix 214 corresponding with that entry is set to 1, and each bit of the entire column within the age matrix 214 corresponding with that entry is set to 0. For example, if E5 is the newest entry in the entry structure 204, then for the age matrix 214 depicted in FIG. 4, each of the relative age bits $A_{51}$, $A_{52}$, $A_{53}$, and $A_{54}$ are set to 1, and the relative age bits $A_{65}$, $A_{75}$, $A_{85}$, $A_{95}$, $A_{10\_5}$, $A_{11\_5}$, $A_{12\_5}$, $A_{13\_5}$, $A_{14\_5}$, $A_{15\_5}$, and $A_{16\_5}$, are set to 0. This is true since the entry E5 is newer than each of the values E1-E4 and E6-E16. The age logic 212 updates the age matrix 214 with each new entry.

Once the relative age bits in the age matrix 214 are updated for each clock cycle, then the grant logic 220 may determine the grant vectors G[1:N]1-G[1:N]P for each of the P dispatch ports. If "i" is an index that ranges from 1 to N to denote the corresponding entry, and "p" is an index that ranges from 1 to P to denote the corresponding dispatch port, then each grant bit of each grant vector is determined as Gip=REQip & NOT(REQ1[p]&$A_{i1}$) & NOT(REQ2[p]&$A_{i2}$) & ... & NOT(REQN[p]&$A_{iN}$), in which "&" denotes the Boolean logic AND function. In this manner, if each of the relative age values of the age matrix 214 were to be used for granting instructions for dispatch, then the entry Ei is granted if and only if ("iff") Ei is ready to be dispatched on the dispatch port p to which it is bound (REQip), and E1 is not bound to port p or E1 is not ready or E1 is newer, and E2 is not bound to port p or E2 is not ready or E2 is newer, and so on. In other words, Ei is granted on port p iff Ei is bound to port p, Ei is ready for dispatch, and Ei is the oldest among the ready entries bound to port p.

The grant function is performed by the logic of the grant logic 220 for each of the P ports for each clock cycle. It has been determined that the grant logic implementing the grant function is difficult to place and route on the microprocessor 100 while meeting timing for each clock cycle when N is large using each the relative age values of the age matrix 214. For example, it is difficult to implement the grant determination when N=64 or larger. A memory implementing an age matrix having a size of 64×64 includes (64×63/2)=2,016 storage elements for storing the relative age values. A separate "wire" or conductive trace has to be routed from each of these storage elements to the grant logic 220 to implement each grant function for each port for each clock cycle. In this case, the number of conductive traces is increased dramatically, so that the speed at which the combinational logic can operate is limited by how well the synthesis and/or layout tools can optimally route the wires. At this level of conductive trace concentration, the speed is substantially reduced accordingly, and the additional time is effectively inserted into the critical timing paths of the scheduler 108. It has been discovered, however, that the grant determination may be simplified using a blurring function to achieve approximated results while also meeting timing requirements when N is large.

It is understood that the microprocessor 100 is a dynamic environment in which some instructions stored in the entry structure 204 are dispatched for execution while new instructions are being issued from the RAT 106 and/or ROB 110. In general, the assignment of each issued instruction to a particular entry within the entry structure 204 is arbitrary. As previously described, in one embodiment up to 8 instructions per cycle may be issued in program order to the scheduler 108, in which the receiver 202 may simply insert the next set of received instructions into the next available set of free entries of the entry structure 204 and mark the corresponding entries as valid by setting the valid bit. The "free" entries are those in which the corresponding valid bit is cleared or false indicating that the entry is available to receive a new instruction, which changes from one clock cycle to the next.

In general, the set of N entries is divided into multiple subsets in which each subset includes M entries, in which M is an integer less than N and in which N is equally divisible by M. In the illustrated embodiment (for N=16 and M=4), the 16 entries E1-E16 is subdivided into 4 subsets E1-E4, E5-E8, E9-E12, and E13-E16. Of course, N and M may vary for different embodiments. Although it is possible that N and M are configured as adjustable or programmable values, N is generally dictated by the available memory size of the entry structure 204 and M is based on N (N is equally divisible by M) and is selected to maximize the blurring or approximating function as further described herein.

The age matrix 214 is shown sub-divided into square-shaped sub-blocks, each having a size of M×M corresponding to the selected subset size. As shown for example, for N=16 and M=4, the age matrix 214 is sub-divided into N/M×N/M sub-blocks, each having a size of 4×4. As illustrated in FIG. 4, the age matrix 214 is sub-divided into sub-blocks 402, 404, 406, 408, 410, 412, 414, 416, 418 and 420 organized from top to bottom and then from left to right. Thus, a set of M×M sub-blocks 402, 410, 416 and 420 are formed along the diagonal, with remaining inner sub-blocks 404, 406, 408, 412, 414 and 418.

FIG. 5 is a diagram illustrating the blur matrix 218 according to one embodiment of the present invention. The blurring function is applied to the age matrix 214 to generate the blur matrix 218. As shown in FIG. 5, the diagonal sub-blocks 402, 410, 416 and 420 may be directly copied into the blur matrix 218. The remaining inner sub-blocks 404, 406, 408, 412, 414 and 418 of the age matrix 214 are replaced by blurred sub-blocks 504, 506, 508, 512, 514 and 518, respectively, within the blur matrix 218. Each of the blurred sub-blocks 504, 506, 508, 512, 514 and 518, include a corresponding blurred age value B1, B2, B3, B4, B5 and B6, respectively.

The blurred sub-blocks 504, 506, 508, 512, 514 and 518 of the blur matrix 218 are each "blurred" or approximated versions of the corresponding inner sub-blocks 404, 406, 408, 412, 414 and 418 of the age matrix 214. According to the blurring or approximating function, each of the sub-blocks 504, 506, 508, 512, 514 and 518 of the blur matrix 218 has a single representative blurred age bit BX, which may be a copy of a selected one of the relative age bits from the corresponding sub-block of the age matrix 214 indicating the relative age between the oldest entry of the subset of row values versus the oldest entry of the subset of column values of the corresponding sub-block of the age matrix 214. The resulting blurred age bit BX is an approximate age value that is instead of the relative age values from the corresponding sub-block of the age matrix 214. In this manner, a single blurred age value is stored and provided to the grant logic 220 from each of the sub-blocks 504, 506, 508, 512, 514 and 518 of the blur matrix 218 rather than any of the individual relative age values from the corresponding inner sub-blocks 404, 406, 408, 412, 414 and 418 of the age matrix 214. Thus, the number of conductive traces from the age logic to the grant logic 220 is dramatically reduced substantially simplifying the circuitry and allowing faster arbitration results to be achieved.

In the blur matrix 218, when comparing the relative age of any pair of the entries from the same subset, the relative age values are used. As shown, the relative age values from the sub-block 402 are used when comparing the relative age between any pair of entries of the subset E1-E4, the relative age values from the sub-block 410 are used when comparing the relative age between any pair of entries of the subset E5-E8, the relative age values from the sub-block 416 are used when comparing the relative age between any pair of entries of the subset E9-E12, and the relative age values from the sub-block 420 are used when comparing the relative age between any pair of entries of the subset E13-E16. In one embodiment, the relative age values in the diagonal sub-blocks 402, 410, 416 and 420 from the age matrix 214 are simply copied into the corresponding sub-blocks of the blur matrix 218. In an alternative embodiment, to reduce the total number of storage elements, the blur matrix 218 does not include the diagonal sub-blocks 402, 410, 416 and 420, but instead the relative age values within these sub-blocks are retrieved directly from the age matrix 214.

In the blur matrix 218, when comparing the relative age of any entry from one subset with an entry from a different subset, the corresponding blurred age value is used. As shown, the blurred age value B1 from the sub-block 504 is used when comparing the relative age between any entry of the subset E1-E4 with any entry from the subset E5-E8, the blurred age value B2 from the sub-block 506 is used when comparing the relative age between any entry of the subset E1-E4 with any entry from the subset E9-E12, the blurred age value B3 from the sub-block 508 is used when comparing the relative age between any entry of the subset E1-E4 with any entry from the subset E13-E16, the blurred age value B4 from the sub-block 512 is used when comparing the relative age between any entry of the subset E5-E8 with any entry from the subset E9-E12, the blurred age value B5 from the sub-block 514 is used when comparing the relative age between any entry of the subset E5-E8 with any entry from the subset E13-E16, and the blurred age value B6 from the sub-block 518 is used when comparing the relative age between any entry of the subset E9-E12 with any entry from the subset E13-E16.

The blur matrix 218 is indexed in the substantially the same manner as the age matrix 214, except that the blurred age value "BX" is returned from the sub-blocks 504, 506, 508, 512, 514 and 518 when indexing any of the relative age bits the corresponding to the sub-blocks 404, 406, 408, 412, 414 and 418. When indexing any of the relative age bits within any of the diagonal sub-blocks 402, 410, 416 and 420, the relative age value is accessed from the location in which it is stored. Thus, for example, the relative age value $A_{76}$ is returned from the blur matrix 218 if copied therein, or is otherwise returned directly from the age matrix 214 (if not copied within the blur matrix 218). When indexing the relative age value $A_{84}$ of the blurred sub-block 504 may not return the same bit value as the relative age bit $A_{84}$, the blurred age value B1 is provided instead. As shown, indexing any of the relative age bits $A_{51}$-$A_{84}$ accesses the single blurred age bit B1 stored for the sub-block 504. Similarly, indexing any of bits $A_{91}$-$A_{12\_4}$ accesses the single blurred age bit B2 stored for the sub-block 506, indexing any of bits $A_{13\_1}$-$A_{16\_4}$ accesses the single blurred age bit B3 stored for the sub-block 508, indexing any of bits $A_{95}$-$A_{12\_8}$ accesses the single blurred age bit B4 stored for the sub-block 512, indexing any of bits $A_{13\_5}$-$A_{16\_8}$ accesses the single blurred age bit B5 stored for the sub-block 514, and indexing any of bits $A_{13\_9}$-$A_{16\_12}$ accesses the single blurred age bit B6 stored for the sub-block 518.

In one embodiment, each blurred age bit BX is a copy of the relative age bit from the corresponding sub-block of the age matrix 214 identifying the relative age between the oldest of the one subset of entries and the oldest of another subset of entries. As shown, for example, B1 is the selected relative age bit that identifies the relative age between oldest of the subset of entries E1-E4 and the oldest of the subset of entries E5-E8, B2 is the selected relative age bit that identifies the relative age between oldest of the subset of entries E1-E4 and the oldest of the subset of entries E9-E12, B3 is the selected relative age bit that identifies the relative age between oldest of the subset of entries E1-E4 and the oldest of the subset of entries E13-E16, B4 is the selected relative age bit that identifies the relative age between oldest of the subset of entries E5-E8 and the oldest of the subset of entries E9-E12, B5 is the selected relative age bit that identifies the relative age between oldest of the subset of entries E5-E8 and the oldest of the subset of entries E13-E16, and B6 is the selected relative age bit that identifies the relative age between oldest of the subset of entries E9-E12 and the oldest of the subset of entries E13-E16.

FIG. 6 is a schematic and block diagram illustrating the blurring function applied to sub-block 404 of the age matrix 214 to determine the blurred age bit B1 of the sub-block 504 of the blur matrix 218 according to one embodiment of the present invention. Each of the relative age bits of the sub-block 404 of the age matrix 214 is provided to a corresponding input of select logic 602. The select logic 602 is represented as a multiplexer (MUX) having an input for each of the relative age bits of the sub-block 404. For example, if the sub-blocks of the age matrix 214 are 4×4 blocks, then the select logic 602 has 16 inputs. A logic block 604 determines the "oldest i" entry among the rows of the sub-block 404 for the subset E5-E8 and provides select values S1 and S2, and another logic block 606 determines the "oldest j" entry among the columns of the sub-block 404 for the subset E1-E4 and provides select values S3 and S4. Thus, the select values S1 and S2 identify the oldest one of the subset of entries E5, E6, E7 and E8 (E5-E8), and the select values S3 and S4 identify the oldest one of the entries E1, E2, E3 and E4 (E1-E4). The select values S1-S4 are provided to the select inputs of the select logic 602, which outputs the selected relative age bit as the blurred age bit B1 for storage by the sub-block 504. In the manner, the sub-block 504 of the blur matrix 218 holds the single blurred age bit B1 that represents each relative age bit of the sub-block 404 of the age matrix 214 for purposes of the grant determination.

As an example, as shown in FIG. 4, the entries E5-E8 are provided as the row values along the vertical edge of the sub-block 404, and the entries E1-E4 are provided as the column values along the horizontal edge of the sub-block 404. Suppose that from among the entries E5-E8, that entry E6 is the oldest, and that from among the entries E1-E4, that entry E3 is the oldest. Then the select values S1 and S2 select the second row and the select values S3 and S4 select the third column of the sub-block 404, which is the relative age bit $A_{63}$ of the age matrix 214. The blur value B1 for the sub-block 504 of the blur matrix 218 is thus a copy of the relative age bit $A_{63}$ for that particular clock cycle. As a more specific example, the inputs of the select logic 602 from top to bottom are S1, S2, S3, S4=0000b, 0001b, 0010b, 1111b, in which "b" denotes a binary value. In this case, E5 is selected as the oldest row value when S1, S2=00b, E6 is selected as the oldest row value when S1, S2=01b, E7 is as the oldest row value when S1, S2=10b, and E8 is as the oldest row value when S1, S2=11b. Also, E1 is selected as the oldest column value when S3, S4=00b, E2 is selected as the oldest column value when S3, S4=01b, E3 is selected as the oldest column value when S3, S4=10b, and E4 is selected as the oldest column value when S3, S4=11b.

The blur logic 216 applies the same blur process to each of the sub-blocks 404, 406, 408, 412, 414 and 418 of the age matrix 214 to generate the single age bits B1-B6 for the sub-blocks 504, 506, 508, 512, 514 and 518, respectively, of the blur matrix 218. The blur logic 216 monitors the age matrix 214 and updates the blur matrix 218 accordingly. In one embodiment, the age logic 212 monitors the entry structure 204 and updates the age matrix 214 each clock cycle, and the blur logic 216 monitors updates of the age matrix 214 and updates the blur values B1-B6 of the blur matrix 218 in the following clock cycle. The blur matrix 218 may or may not be registered, but is nonetheless updated each clock cycle.

The use of the logic blocks 604 and 606 to determine the representative blurred age bit preserves the transitivity property. In particular, if entry i is newer than entry j, and if entry j is newer than entry k, then entry i is newer than entry k. In other words, $A_{ij}$ & $A_{jk} \Rightarrow A_{ik}$. In this manner, the blurred age bit $B_{ik}$ may represent the oldest one of $A_{ij}$ and $A_{jk}$, and thus may represent all of the relative age bits of a corresponding sub-block.

It is appreciated that the total number of age bits (relative or blurred) provided by the blur matrix 218 is substantially less than the total number of relative age bits of the age matrix 214. Given the corresponding 16×16 matrix sizes of the matrices 214 and 218, the blur matrix 218 provides only 6 blurred age bits B1-B6 from the blurred inner sub-blocks 504, 506, 508, 512, 514, and 518, respectively, to represent the corresponding 96 different relative age bits from the inner sub-blocks 404, 406, 408, 412, 414, and 418 of the age matrix 214. In this manner, the circuitry providing the age values to the grant logic 220 for updating the grant vectors to make the grant determinations may be substantially simplified. The grant logic 220 itself implementing the grant equations for determining the grant vectors may be substantially the same, except that one blurred age bit replaces multiple relative age bits to simplify the circuitry and to accelerate the arbitration process for each of the dispatch ports 208.

If the relative age values from the age matrix 214 were used directly without the blurring function, then a separate wire or conductive trace must be routed from each storage device storing a corresponding age bit to the combination logic implementing the grant equations within the grant logic 220. For the age matrix 214 shown in FIG. 4, at least 120 different conductive wires or traces must be routed from the age matrix 214 to the grant logic 220. If instead the blur matrix 218 is used (at least for the blurred age bits BX), then only 30 conductive wires or traces are routed to the grant logic 220. The wire for each of the blurred age bits BX is fanned out to multiple locations of the combination logic implementing the grant equation within the grant logic 220.

As the number of entries of the entry structure 204 increases, the size, and thus the area, of the age matrix 214, the grant logic 220, and the conductive wires in between increases quadratically. The size includes both the storage devices in the age matrix 214, the combinational logic used to implement the grant function, and the conductive wires. If the scheduler 108 has to dispatch back-to-back dependent integer instructions every clock cycle, the age matrix 214 and the grant logic 220 would need to deliver the grant decisions in half the time, or about half of a clock cycle. This is true since the second half of the clock cycle is used for marking dependent instructions to make them ready for dispatch in the next clock cycle. In this manner, if used directly, the timing constraints of the age matrix 214 places limits as to how large it can be and thus how many entries may be handled by the scheduler 108.

Consider, for example, a full age matrix having a size 64×64 including 2,016 (64×63/2) different relative age bits and corresponding storage elements. If only the age matrix 214 was used, 2,016 conductive wires would have to be routed and placed between the age storage elements and the grant logic 220. The number of wires is increased dramatically, so that the speed at which the combinational logic can operate is limited by how well the synthesis and/or layout tools can optimally route the wires. At this level of conductive trace concentration, the speed is substantially reduced accordingly, and the additional time is effectively inserted into the critical timing paths of the scheduler 108.

In contrast, a blur matrix approximating a 64×64 age matrix includes only 216 storage elements and corresponding conductive wires. Thus, the number of conductive wires is reduced ten-fold. In this manner, the approximated age and grant functions may be implemented in less area and the grant decision may be made in significantly less time. It is true that the addition of a blur matrix actually increases the number of age storage elements above that which is needed if a full age matrix is used alone. Also, the blur logic adds more logic used to update the blur matrix with the blurred age values. Nonetheless, the use of the blurred age values substantially reduces the grant circuitry to enable grant decisions to be made in significantly less time to achieve near-ideal results. In this manner, the number of entries may be increased while the grant logic 220 is still able to generate grant decisions within predetermined timing parameters.

The arbitration result using a blurred age bit BX from the blur matrix 218 is an approximation of the result using the corresponding relative age bits from the age matrix 214. In the approximated result, a younger instruction may be dispatched before an older instruction from the same dispatch port even though the older instruction was also ready for dispatch. Consider, for example, instructions are received in the following order I1, I7, I2, I3, I4, I5, I6 and I8 and stored into corresponding entries E1, E7, E2, E3, E4, E5, E6 and E8, respectively. In this case, I1 is the oldest instruction (entry E1), I7 is the second oldest instruction (entry E7), and so on. In the blur matrix 218, the blurred age value B1 is determined as the age bit representing the relative age between the oldest of the subset of entries E1-E4, which is E1, and the oldest of the subset of entries E5-E8, which is E7. In the age matrix 214, the relative age bit $A_{71}$ identifies the relative age between entries E1 and E7. Since E7 newer than E1, then $B1=A_{71}=0$. Essentially, this means that the entries E5, E6 and E8 are imputed with the same relative age as E7, but this also means that the entries E2, E3 and E4 are imputed with the same relative age as E1. Thus, even though the entries E2, E3 and E4 are younger than E7, the blurred age bit B1 imputes an older age than E7.

Continuing the previous example, assume further that the instructions for E4 and E7 are both bonded to dispatch port P1 and that both become ready to dispatch at about the same time (or within the same clock cycle). In the age matrix 214, since E7 is older than E4, then the corresponding relative age value $A_{74}=1$. When the grant vector for port P1 is determined, since E7 is older than E4, E7 would normally win the arbitration and be dispatched from port P2 first. When the blurred age value B1 is used instead of the corresponding relative age value $A_{74}$, E4 wins the arbitration and is dispatched from port P2 first. In microprocessor 100, this result does not cause malfunction since if it turns out that an incorrect result occurs (such as if instruction I4 is dependent upon the results of instruction I7), the error is detected in time and the instructions are replayed in correct order. The ROB 110 ensures in-order retirement and other mechanisms are in place so that the O-O-O microprocessor 100 is configured to ensure the proper end result. On the average for an O-O-O processor, however, possible incorrect results are inconsequential or otherwise outweighed by the benefits and advantages achieved. For many cases, the instructions are not dependent upon each other so that out of order execution does not cause an incorrect result. Also, the different instructions may be bonded to different ports, or may otherwise become ready for dispatch at different times, so that they may not arbitrate directly with each other.

The selection of the total number of entries (N) and the number of the subsets (or number of entries per subset) depend upon the particular application and the relative level of accuracy desired to be achieved. Although the size of each subset may be increased to further reduce the number of age values provided to grant logic, there may be a corresponding reduction in the level of accuracy achieved, such as a larger number of younger (or lower priority) entries winning arbitration over time. Similarly, the size of each subset may be reduced to improve accuracy at the expense of increased circuitry to convey age values to the grant logic. The size of the subsets may be uniform although different sized subsets may be used in a given configuration. For example, it is possible to implement a blurred age matrix with mixed sub-block sizes of 2×2, 3×3, 4×4, etc. Generally, however, the subsets do not overlap in which each entry is included within only one subset.

Although an approximate result is not necessarily ideal from a perfect arbitration standpoint, such approximate results using blurred or approximate values is inconsequential over time for applications in which approximate results are allowed. On average and over time using the blurred approximation, older entries generally win arbitration before younger entries and overall performance is maintained or even improved. Although a system and method of accelerating arbitration using approximate age values according to an embodiment of the present invention has been demonstrated for a processor based application, it may be used in many other applications and contexts in which it is desired to arbitrate among multiple requests for one or more resources.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like. Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. An arbiter that performs accelerated arbitration, comprising:
   a memory that stores a plurality of relative age values in which each of said plurality of relative age values identifies a relative age between a corresponding pair of a plurality of entries, and wherein said memory further stores a plurality of blurred age values;
   wherein said plurality of entries are divided into a plurality of subsets in which each of said plurality of subsets comprises more than one and less than all of said plurality of entries and wherein each entry is included in only one of said plurality of subsets;
   blur logic circuitry configured to generate said plurality of blurred age values in which each of the plurality of blurred age values is generated to represent a relative age between any entry of one subset and any entry of a different subset; and grant logic circuitry configured to grant one of at least two of said plurality of entries access to said at least one resource based on relative age, wherein said grant logic circuitry uses a corresponding one of said plurality of relative age values when comparing relative age between each pair of said at least two of said plurality of entries that are within a common subset, and wherein said grant logic circuitry uses a corresponding one of said plurality of blurred age values when comparing relative age between each pair of said at least two of said plurality of entries that are in different subsets;

wherein said memory comprises an age matrix and a blur matrix both comprising a plurality of diagonal sub-blocks and a plurality of inner sub-blocks, wherein each of the plurality of inner sub-blocks of the age matrix stores said plurality of relative age values each indicating a relative age between each pair of entries within a common subset, and the plurality of inner sub-blocks of the blur matrix store said plurality of blurred age values, each being a single bit, and wherein each of the plurality of diagonal sub-blocks only stores said plurality of relative age values each indicating a relative age between each pair of entries within a common subset.

2. The arbiter of claim 1, further comprising binder logic circuitry configured to bind each of said plurality entries to one of a plurality of resources in which each entry only arbitrates for a resource to which it is bound.

3. The arbiter of claim 1, further comprising ready logic circuitry configured to determine when each of said plurality of entries is ready to arbitrate in which said each of said plurality of entries only arbitrates after being determined to be ready.

4. The arbiter of claim 3, further comprising binder logic circuitry configured to bind each of said plurality entries to one of a plurality of resources in which each entry only arbitrates for a resource to which it is bound after being determined to be ready to arbitrate.

5. The arbiter of claim 4, wherein said binder logic circuitry sets up to one bit of a corresponding one of a plurality of one-hot bind vectors for each of said plurality of entries indicating up to one of said plurality of resources for each of said plurality of one-hot bind vectors, wherein said ready logic circuitry sets one of a plurality of ready bits when a corresponding entry is ready to arbitrate, and wherein each of a plurality of one-hot request vectors is determined by logically ANDing each bit of a corresponding one of said plurality of one-hot bind vectors with a corresponding ready bit.

6. The arbiter of claim 5, wherein said grant logic circuitry determines each of a plurality of one-hot grant vectors by logically combining said plurality of one-hot request vectors with said plurality of relative age values when comparing relative age between entries within a common subset and said plurality of blurred age values when comparing relative age between entries in different subsets.

7. The arbiter of claim 1, wherein said blur logic circuitry comprises:

first age logic circuitry configured to select an oldest entry of a first subset of said plurality of entries and that provides at least one first select signal;

second age logic circuitry configured to select an oldest entry of a second subset of said plurality of entries and that provides at least one second select signal; and select logic circuitry configured to use said at least one first select signal and said at least one second select signal to generate a blurred age value as a selected one of a plurality of relative age values between entries of said first and second subsets.

8. A method of accelerating arbitration using approximate relative ages, comprising:

determining a plurality of relative age values each indicating a relative age between a pair of a plurality of entries that arbitrate for at least one resource, wherein the plurality of relative age values are stored in a memory;

dividing the plurality of entries into a plurality of subsets wherein each subset comprises more than one and less than all of the plurality of entries and wherein each entry is included in only one subset;

generating a plurality of blurred age values in which each of the plurality of blurred age values is generated to represent a relative age between any entry of a first subset and any entry of a second and different subset; and granting access of the at least one resource to one of at least two of the plurality of entries based on relative age, wherein said granting access comprises:

using a corresponding relative age value when comparing a relative age between two entries that are within a common subset; and using a corresponding blurred age value when comparing a relative age between two entries that are in different subsets;

wherein said memory comprises an age matrix and a blur matrix both comprising a plurality of diagonal sub-blocks and a plurality of inner sub-blocks, wherein each of the plurality of inner sub-blocks of the age matrix stores said plurality of relative age values each indicating a relative age between each pair of entries within a common subset, and the plurality of inner sub-blocks of the blur matrix store said plurality of blurred age values, each being a single bit, and wherein each of the plurality of diagonal sub-blocks only stores said plurality of relative age values each indicating a relative age between each pair of entries within a common subset.

9. The method of claim 8, further comprising binding each entry to one of a plurality of resources in which each entry only arbitrates for a resource to which it is bound.

10. The method of claim 8, further comprising determining when each entry is ready to arbitrate in which each entry only arbitrates after being determined to be ready.

11. The method of claim 10, further comprising binding each entry to one of a plurality of resources in which each entry only arbitrates for a resource to which it is bound when being determined to be ready to arbitrate.

12. The method of claim 8, further comprising:

providing a corresponding one of a plurality of bind vectors for each of the plurality of entries in which each bind vector includes a plurality of bits in which each bit corresponds with one of a plurality of resources;

binding an entry to one of the plurality of resources including setting only one bit that corresponds with the selected resource of a corresponding bind vector that corresponds with the entry;

setting one of a plurality of ready bits when a corresponding entry is ready to arbitrate for a resource to which it is bound; and generating a request vector for each entry by logically ANDing the corresponding ready bit with the corresponding bind vector in which each request vector indicates when a corresponding entry is ready to arbitrate for a resource to which it is bound.

13. The method of claim 12, wherein said granting access comprises logically combining the plurality of request vectors with age bits when comparing a relative age between two entries within a common subset and combining the plurality of request vectors with blurred age bits when comparing a relative age between two entries within different subsets.

14. A microprocessor, comprising:
a scheduler that performs accelerated arbitration to arbitrate between a plurality of instructions issued for execution, wherein said plurality of instructions are separated into a plurality of subsets in which each of said plurality of subsets comprises at least one and less than all of said plurality of instructions and wherein each instruction is included in only one of said plurality of subsets, said scheduler comprising:
a memory that stores a plurality of relative age values in which each relative age value determines a relative age between two different instructions, and wherein said memory further stores a plurality of approximate age values;
approximating logic circuitry configured to generate said plurality of approximate age values in which each of the plurality of approximate age values is generated to represent a relative age between any instruction of one subset and any instruction of a different subset; and
grant logic circuitry configured to grant one of at least two of said plurality of instructions for execution using a corresponding one of said plurality of relative age values when comparing relative age between each pair of said at least two instructions that are within a common subset, and that uses a corresponding one of said plurality of approximate age values when comparing relative age between each pair of at least two instructions that are in different subsets;
wherein said memory comprises an age matrix and a blur matrix both comprising a plurality of diagonal sub-blocks and a plurality of inner sub-blocks, wherein each of the plurality of inner sub-blocks of the age matrix stores said plurality of relative age values each indicating a relative age between each pair of entries within a common subset, and the plurality of inner sub-blocks of the blur matrix store said plurality of approximate age values, each being a single bit, and wherein each of the plurality of diagonal sub-blocks only stores said plurality of relative age values each indicating a relative age between each pair of entries within a common subset.

15. The microprocessor of claim 14, wherein said scheduler further comprises binder logic circuitry configured to bind each of said plurality instructions to one of a plurality of execution units in which each instruction only arbitrates for one execution unit to which it is bound.

16. The microprocessor of claim 14, wherein said scheduler further comprises ready logic circuitry configured to determine when each of said plurality of instructions is ready to arbitrate in which said each of said plurality of instructions only arbitrates after being determined to be ready.

17. The microprocessor of claim 16, wherein said scheduler further comprises binder logic circuitry configured to bind each of said plurality instructions to one of a plurality of execution units in which each instruction only arbitrates for one execution unit to which it is bound after being determined to be ready to arbitrate.

18. The microprocessor of claim 17, wherein said binder logic circuitry sets up to one bit of a corresponding one of a plurality of one-hot bind vectors for each of said plurality of instructions indicating up to one of said plurality of execution units for each of said plurality of one-hot bind vectors, wherein said ready logic circuitry sets one of a plurality of ready bits when a corresponding instruction is ready to arbitrate, and wherein each of a plurality of one-hot request vectors is determined by logically ANDing each bit of a corresponding one of said plurality of one-hot bind vectors with a corresponding ready bit.

19. The microprocessor of claim 18, wherein said grant logic circuitry determines each of a plurality of one-hot grant vectors by logically combining said plurality of one-hot request vectors with said plurality of relative age values when comparing relative age between instructions within a common subset and said plurality of approximate age values when comparing relative age between instructions in different subsets.

* * * * *